No. 618,799. Patented Jan. 31, 1899.
J. A. MOSHER.
PHOTOGRAPHIC SHUTTER.
(Application filed Oct. 14, 1898.)
(No Model.)
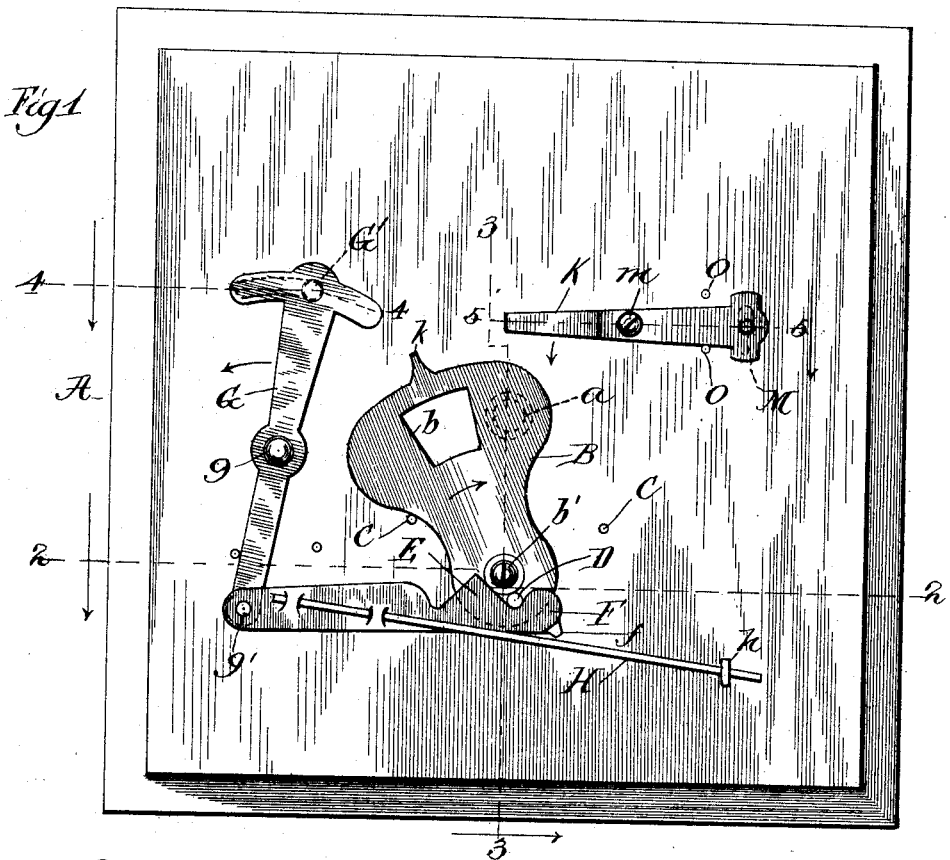
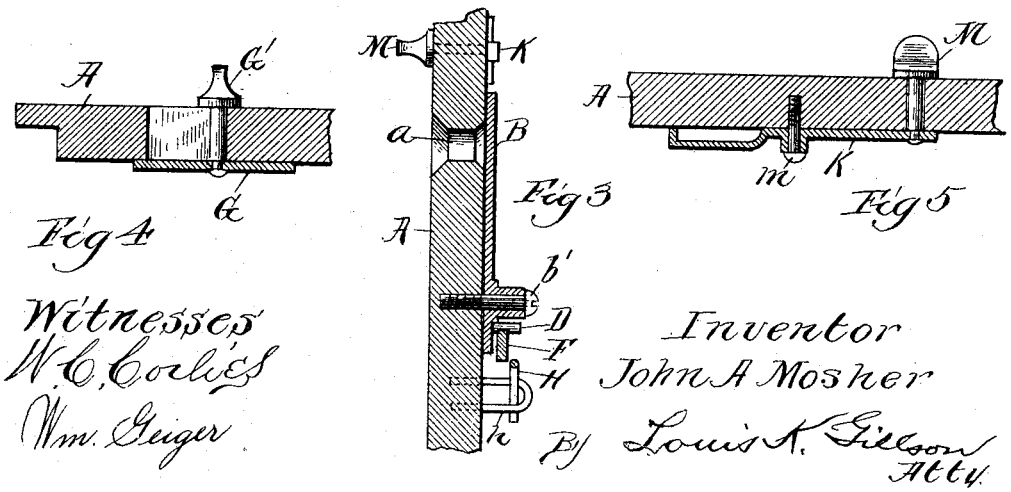
Witnesses
N. C. Corliss
Wm. Geiger
Inventor
John A. Mosher
By Louis K. Gillson
Atty.

UNITED STATES PATENT OFFICE.

JOHN A. MOSHER, OF CHICAGO, ILLINOIS, ASSIGNOR TO THE ADAMS & WESTLAKE COMPANY, OF ILLINOIS.

PHOTOGRAPHIC SHUTTER.

SPECIFICATION forming part of Letters Patent No. 618,799, dated January 31, 1899.

Application filed October 14, 1898. Serial No. 693,546. (No model.)

*To all whom it may concern:*

Be it known that I, JOHN A. MOSHER, a citizen of the United States, and a resident of Chicago, county of Cook, and State of Illinois, have invented certain new and useful Improvements in Camera-Shutters, of which the following is a specification, and which are illustrated in the accompanying drawings, forming a part thereof.

The invention relates to that class of shutters in which an oscillating apertured plate plays across the lens-aperture of a photographic camera and is so mounted and operated that it effects an exposure at each movement across the lens-aperture and without preliminary setting.

The objects of the invention are to simplify the construction and action of shutters of this class and to secure prompt and reliable action. These objects are attained by the construction hereinafter described, and which is fully illustrated in the accompanying drawings, in which—

Figure 1 is an elevation of the inner face of the front plate of a camera, the shutter and its actuating mechanism being mounted thereon. Fig. 2 is a sectional view on the line 2 2 of Fig. 1. Figs. 3, 4, and 5 are detail sections on the lines 3 3, 4 4, and 5 5, respectively, of Fig. 1.

The front plate of a camera is shown at A, and an ordinary shutter-plate, substantially segmental in form, is shown at B and is provided with an exposing-aperture $b$ and is mounted, by means of a pivot-pin $b'$, so that it oscillates between the fixed stops C C. The lens-aperture in the plate A is represented at $a$, and the shutter-plate is so mounted that its aperture $b$ crosses this lens-aperture as the shutter oscillates.

A stud or pin D projects from the face of the plate B and is preferably, though not necessarily, located in the heel of the plate—that is to say, upon the opposite side of its pivot-pin with reference to the aperture $b$. A V-cam E, carried by and preferably formed integrally with a reciprocating plate F, coöperates with the stud D, and the plate F is controlled by means of a push-button G', located upon the outer face of the plate A and having a shank or stem which extends through a suitable slot in this plate, allowing the button a to-and-fro movement. The button G' is preferably connected with the plate F by means of a rock-lever G, pivoted to the inner face of the plate A at $g$ and to the arm F at $g'$. In order to prevent frictional contact of the plate F with the shutter-plate B, the former is mounted upon the outer face of the lever G and at its farther end is provided with an inturned lug $f$, adapted to slide upon the face of the plate A.

A spring H is fixedly attached to the plate F and is in approximately longitudinal relation therewith and, projecting beyond this plate, slides in a loop $h$, fixed to the plate A. As shown, the spring H is a straight wire. It may take any other desired form, providing it is so mounted that by extension it causes the V-cam E to bear against the stud D.

A stop-arm K is pivoted at $m$ to the inner face of the plate A and is adapted to reciprocate between the fixed stops O O and is controlled by means of a push-button M, the stem of which passes through a suitable slot in the plate A and is fixed in the arm K. A suitable catch, such as the lug $k$, is attached to the plate B, and the parts are so disposed that the arm K may be thrown into the path of this catch, so as to stop the shutter when its aperture $b$ is in register with the aperture $a$.

The operation of the shutter is as follows: Assuming the parts to be in the position shown in Fig. 1, movement of the plate F to the right will cause its depression by reason of the sliding of the right face of the cam E upon the stud D until the apex of the cam is reached, and this pressure will hold the plate B in the position in which it is shown. As soon as the apex of the cam E passes the stud D and the left face of the cam bears upon this stud the pressure of the spring H tends to and does throw the shutter to the right, and the parts are at once in readiness for a reverse movement. Upon reversing the movement of the plate F the operation of the shutter is repeated in the reversed direction. Should the arm K be thrown into the path of the lug $k$, the shutter will be stopped with its aperture $b$ in register with the aperture $a$ for a time-exposure, and the shutter is closed by a reverse movement of the plate F.

It is understood, of course, that the movement of the plate F is accomplished by a to-and-fro movement of the button G'.

I claim as my invention—

1. In a camera-shutter, an oscillating plate, and a reciprocating bar, in combination with a V-cam carried by one of such members, a bearing part carried by the other of such members and coöperating with the cam, and a spring for maintaining the cam and bearing part in contact.

2. In a camera-shutter, the combination with an oscillating shutter-plate and a stud projecting from its surface, of a reciprocating bar, a V-cam carried by such bar and engaging the stud, and a spring for forcing the cam against the stud.

3. In a camera-shutter, an oscillating plate, and a reciprocating bar, in combination with a V-cam carried by one of such members, a bearing part carried by the other of such members and coöperating with the cam, a spring for maintaining the cam and bearing part in contact, and an oscillating lever for reciprocating the bar.

4. In a camera-shutter, an oscillating plate, and a reciprocating bar, in combination with a V-cam carried by one of such members, a bearing part carried by the other of such members and coöperating with the cam, a spring for maintaining the cam and bearing part in contact, and a movable detent adapted to intercept the shutter-plate intermediate of the normal limits of its movement.

JOHN A. MOSHER.

Witnesses:
PAUL SYNNESTVEDT,
HESTER B. BAIRD.